(12) United States Patent
Rick (10) Patent No.: US 6,501,370 B1
(45) Date of Patent: Dec. 31, 2002

(54) VEHICLE ANTI-THEFT LOCK APPARATUS AND METHOD

(76) Inventor: Frank G. Rick, 114 Gilfillan St., Franklin, PA (US) 16323

( * ) Notice: Subject to any disclaimer, the term of this patent is extended or adjusted under 35 U.S.C. 154(b) by 0 days.

(21) Appl. No.: 09/460,782

(22) Filed: Dec. 14, 1999

Related U.S. Application Data (63) Continuation-in-part of application No. 08/931,790, filed on Sep. 16, 1997, now Pat. No. 6,000,489.
(60) Provisional application No. 60/026,165, filed on Sep. 16, 1996.

(51) Int. Cl.$^7$ ................................................. B60Q 1/00
(52) U.S. Cl. .................. 340/425.5; 340/426; 340/5.31; 180/287
(58) Field of Search ............................ 340/425.5, 426, 340/5.25, 5.64, 5.72, 825.72, 5.65, 5.31; 180/287; 307/10.2, 10.3, 10.4, 10.7

(56) References Cited

U.S. PATENT DOCUMENTS

| | | | |
|---|---|---|---|
| 3,641,489 A | 2/1972 | Shimomura | 180/287 |
| 4,258,819 A | 3/1981 | Baptiste, Sr. | 180/287 |
| 4,300,057 A | 11/1981 | Batlle Crosas | 307/10.1 |
| 4,318,288 A | 3/1982 | Rifat | 70/252 |
| 4,463,340 A | 7/1984 | Adkins et al. | 340/64 |
| 4,546,846 A | 10/1985 | Myers | 180/287 |
| 4,562,710 A | 1/1986 | Lipschutz | 70/252 |
| 4,581,909 A | 4/1986 | Weber | 70/186 |
| 4,636,651 A | 1/1987 | Kilgore | 307/10 |
| 4,687,945 A * | 8/1987 | Ebeling | 290/37 R |
| 4,719,460 A | 1/1988 | Takeuchi et al. | 340/825.31 |
| 4,982,584 A | 1/1991 | Takeda et al. | 70/252 |
| 5,016,454 A | 5/1991 | Al-Sheikh | 70/185 |
| 5,052,509 A | 10/1991 | Dzioba | 180/287 |
| 5,079,435 A | 1/1992 | Tanaka | 307/10.2 |
| 5,136,284 A | 8/1992 | Kitamura | 340/825 |
| 5,193,641 A * | 3/1993 | Durrell | 180/287 |
| 5,307,048 A | 4/1994 | Sonders | 340/426 |
| 5,570,756 A * | 11/1996 | Hatcher | 180/287 |
| 5,694,335 A * | 12/1997 | Hollenberg | 340/5.65 |
| 5,782,974 A * | 7/1998 | Sorensen et al. | 117/82 |
| 5,838,227 A * | 11/1998 | Murray | 340/425.5 |
| 5,861,799 A * | 1/1999 | Szwed | 340/425.5 |

\* cited by examiner

*Primary Examiner*—Van Trieu
(74) *Attorney, Agent, or Firm*—Wayne L. Lovercheck (57) ABSTRACT

An anti-theft lock structure for a vehicle having a code box which must be accessed to enable the vehicle to operate. When the vehicle is not enabled the steering column is locked in position, the gear shift lever is locked in position so the transmission cannot change gears, the front brakes are locked and the rear brakes are separately locked; and the electrical system, for a gas engine is disabled at the distributor, and the fuel system, for a diesel engine, is disabled at the fuel cell. The lock has a piston slidably received in a hydraulic cylinder having a piston rod extending from the piston to an operative shaft. An electromagnet is supported on the hydraulic cylinder and adjacent to the piston so that the field from the electromagnet holds the piston rod out of engagement with the operative shaft when the ignition of the engine is turned on. The engine has an oil system connected to the hydraulic cylinder to force the magnetic piston away from the gear rim when the engine has started. A helical compression spring is supported on the hydraulic cylinder which urges the piston from the operative shaft and disengages the piston rod from operative shaft.

19 Claims, 7 Drawing Sheets

VEHICLE ANTI-THEFT LOCK APPARATUS AND METHOD

CROSS-REFERENCE TO RELATED APPLICATIONS

This Application is a Continuation-In-Part of Utility Application No. 08/931,790, filed Sep. 16,1997 to issue as U.S. Pat. No. 6,000,489, filed Dec. 14,1999, which claims the benefit of U.S. Provisional application Ser. No. 60/026, 165, filed Sep. 16, 1996.

STATEMENT REGARDING FEDERALLY SPONSORED RESEARCH OR DEVELOPMENT

Not applicable

BACKGROUND OF THE INVENTION

There is a need for a security device to prevent vehicle theft.

Applicant is aware of the following U.S. Pat. Nos. 3,641, 489; 4,258,819; 4,300,057; 4,318,288; 4,463,340; 4,546, 846; 4,562,710; 4,581,909; 4,636,651; 4,719,460; 4,982, 584; 5,016,454; 5,052,509; 5,079,435; 5,136,284; and 5,307,048.

BRIEF SUMMARY OF THE INVENTION

This invention relates to vehicle locks for locking movable parts of a vehicle to prevent theft of the vehicle. The lock requires a vehicle with a pressurized lubricated oil supply in one embodiment and requires an electrical system in another embodiment and a fuel system in a third embodiment. The lock disables certain features of the vehicle that are necessary for the operation or movement of the vehicle.

It is an object of the present invention to provide a theft prevention device that will prevent the function of parts of the vehicle that are necessary to its operation.

It is another object of the present invention to provide an improved vehicle component lock to prevent the theft of vehicles.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

DETAILED DESCRIPTION OF THE INVENTION

In a vehicle 10 a locking device is activated and operated through code box 44 by the following step by step method of operation:

1) place key 70 in ignition switch 46 and turn to the accessory position (not shown);
2) turn on right side switch 73 of code box 44 and first red light 75 comes on;
3) enter seven number code, i.e.,4327813, and first green light 76 comes on;
4) turn on left side switch 74 of code box 44 and second red light 79 comes on;
5) enter seven number code, i.e.,4327813, and second green light 80 comes on thereby activating infrared switch 84;
6) now engine 15 can be started. Oil pressure unlocks steering, unlocks transmission and brakes are released (the first number entered activates infrared signal. The other six must be entered to make it work);
7) drive;
8) when destination is reached, depress the brake petal (not shown); shut off engine 15; shut off left side switch 74 of code box 44. At this time the infrared signal to distributor 81 is off, steering column lock 82 is locked, transmission lock 83 is locked and front brake lock 77 is locked and rear brake lock 78 is locked; and,
9) to remove or change code: turn off right side switch 73 on code box 44 and back on; enter in seven number code (4327813) in reverse (3187234); now enter new seven number code. This is done when vehicle 10 is left to be repaired. When picked up replace numbers. That way no one has his or her code numbers.

Figure 1:
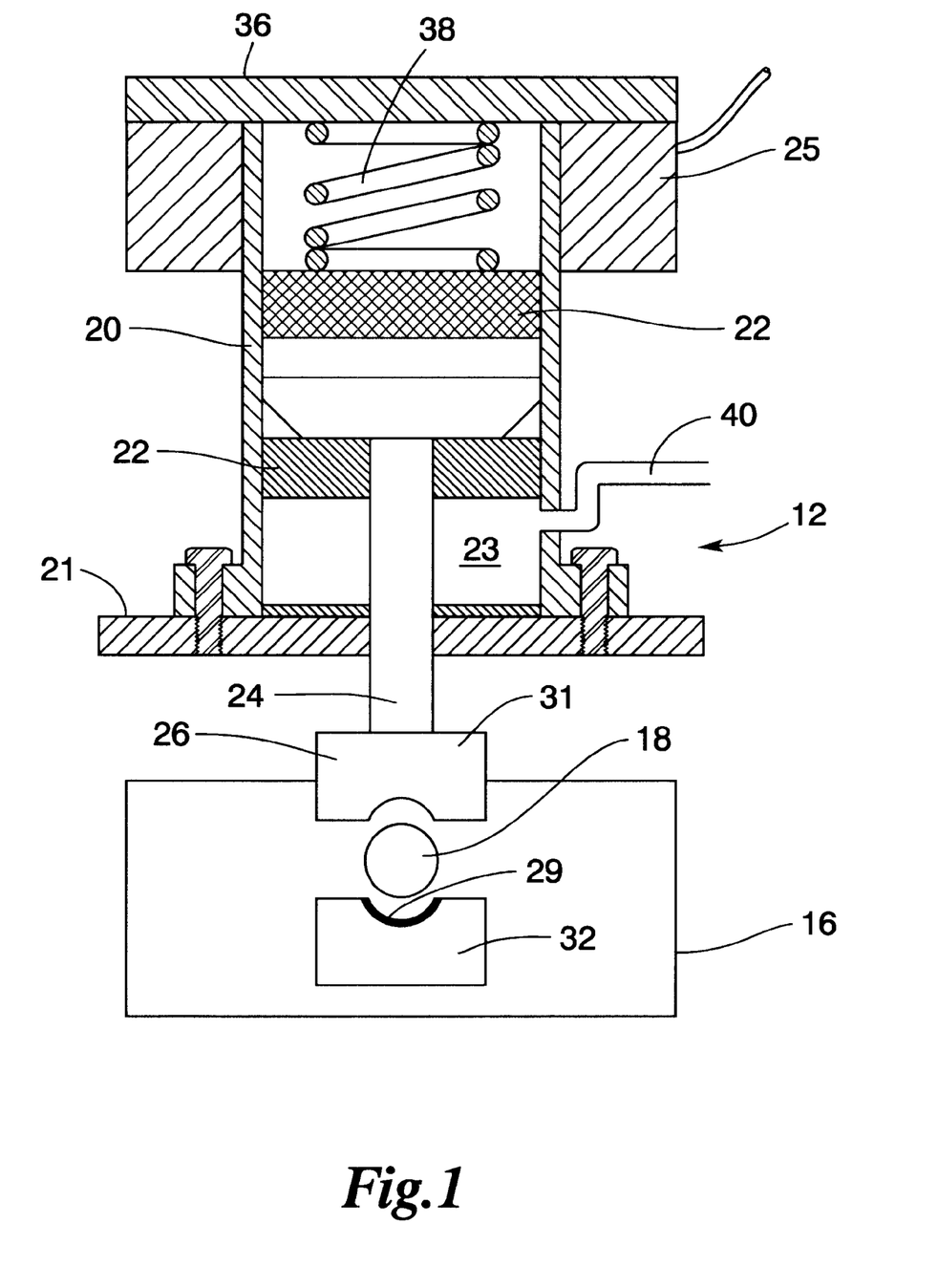
FIG. 1 is a lateral cross sectional view of a shift lever lock according to the invention.

Now with more particular reference to the drawings, FIG. 1 shows shifter lever lock 12 for use on a vehicle (not shown) of the type in general use having engine 15, transmission 16 and shifter lever 18.

Figure 7:
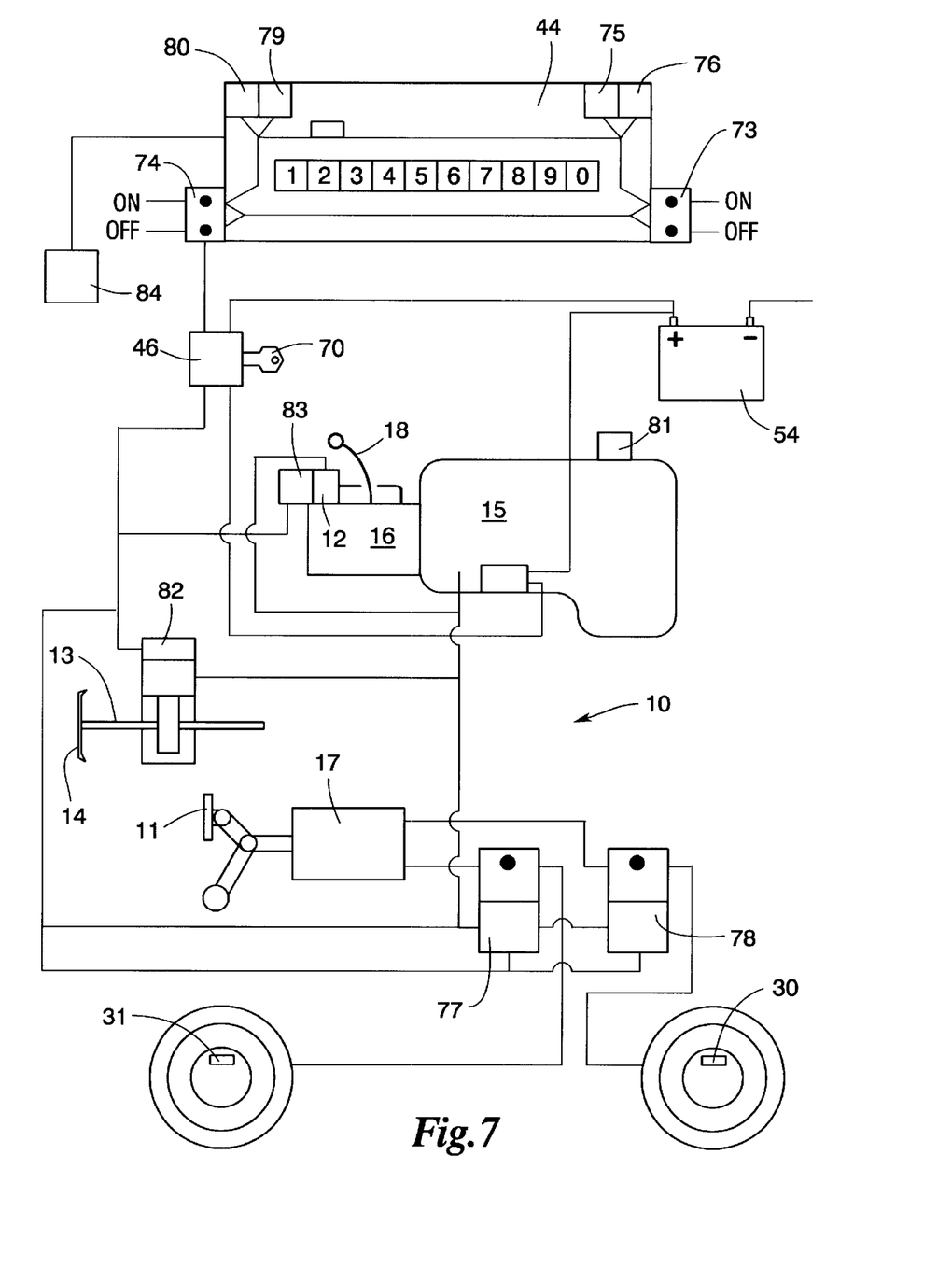
FIG. 7 is a schematic view of the vehicle anti-theft lock apparatus according to the invention.

Referring to FIGS. 1 and 7 engine oil pressure unlocks transmission 16. Electromagnet 25 holds lock block 26 open while the engine is running until electromagnet switch 19 which is connected to electromagnet 25 is opened.

Transmission shifter lever lock 12 is made up of hollow cylinder 20 that is supported on fire wall 21. Hollow cylinder 20 has magnetic piston 22. Piston rod 24 is fixed to magnetic piston 22. Piston rod 24 has lock block 26 on its outer end. Lock block 26 is clamped to transmission 16. Lock block 26 has liner 29. Helical compression spring 38 is received in hollow cylinder 20 above magnetic piston 22 and under cylinder head 36. Engine oil line 40 is connected to the engine oil system so that engine oil under pressure will enter space 23 under magnetic piston 22 when engine 15 starts.

When engine 15 is not running, helical compression spring 38 holds lock block 26 in contact with shifter lever 18, which is held against movement by fixed block 32 and cannot be shifted. Code box switch 44 and ignition switch 46 are connected in series with each other.

Magnetic piston 22 can only be operated by means of code box 44 and timer switch 57, or by oil pressure from line 40. When ignition switch 46 is turned off, engine 15 will stop and the engine oil pressure will decrease. The oil pressure reduction allows lock block 26 to move into engagement with shifter lever 18.

Figure 8:
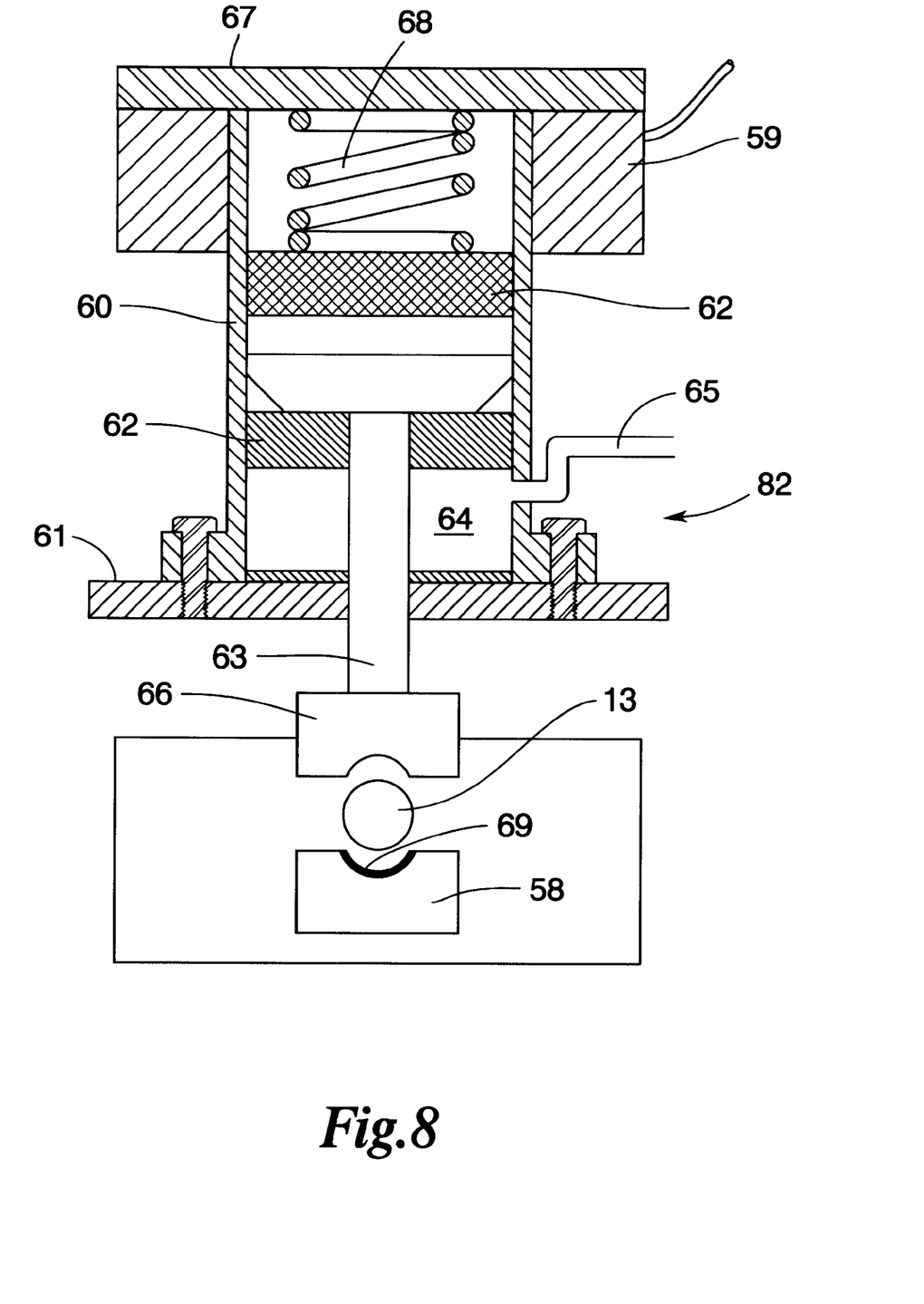
FIG. 8 is a lateral cross sectional view of the steering column lock according to the invention.

Referring to FIG. 8, steering column lock 82 engages steering column 13 locking steering column 82 in place so that an operator is unable to steer with steering wheel 14. Steering column lock 82 is made up of hollow cylinder 60 that is supported on vehicle structure 61. Hollow cylinder 60 has magnetic piston 62. Piston rod 63 is fixed to magnetic piston 62. Piston rod 63 has lock block 66 on its outer end. Lock block 66 is clamped to steering column 13. Lock block 66 has liner 69. Helical compression spring 68 is received in hollow cylinder 60 above magnetic piston 62 and under cylinder head 67. Engine oil line 65 is connected to the engine oil system so that engine oil under pressure will enter engine oil space 64 under magnetic piston 62 when engine 15 starts.

When engine 15 is not running, helical compression spring 68 holds lock block 66 in contact with steering column 13, which is held against movement and cannot be rotated. Code box switch 44 and ignition switch 46 are connected in series with each other.

Magnetic piston 62 can only be operated by means of code box 44 and timer switch 57, or by oil pressure from line 65. When ignition switch 46 is turned off, engine 15 will stop and the engine oil pressure will decrease. The oil pressure reduction allows lock block 66 to move into engagement with steering column 13.

Figure 6:
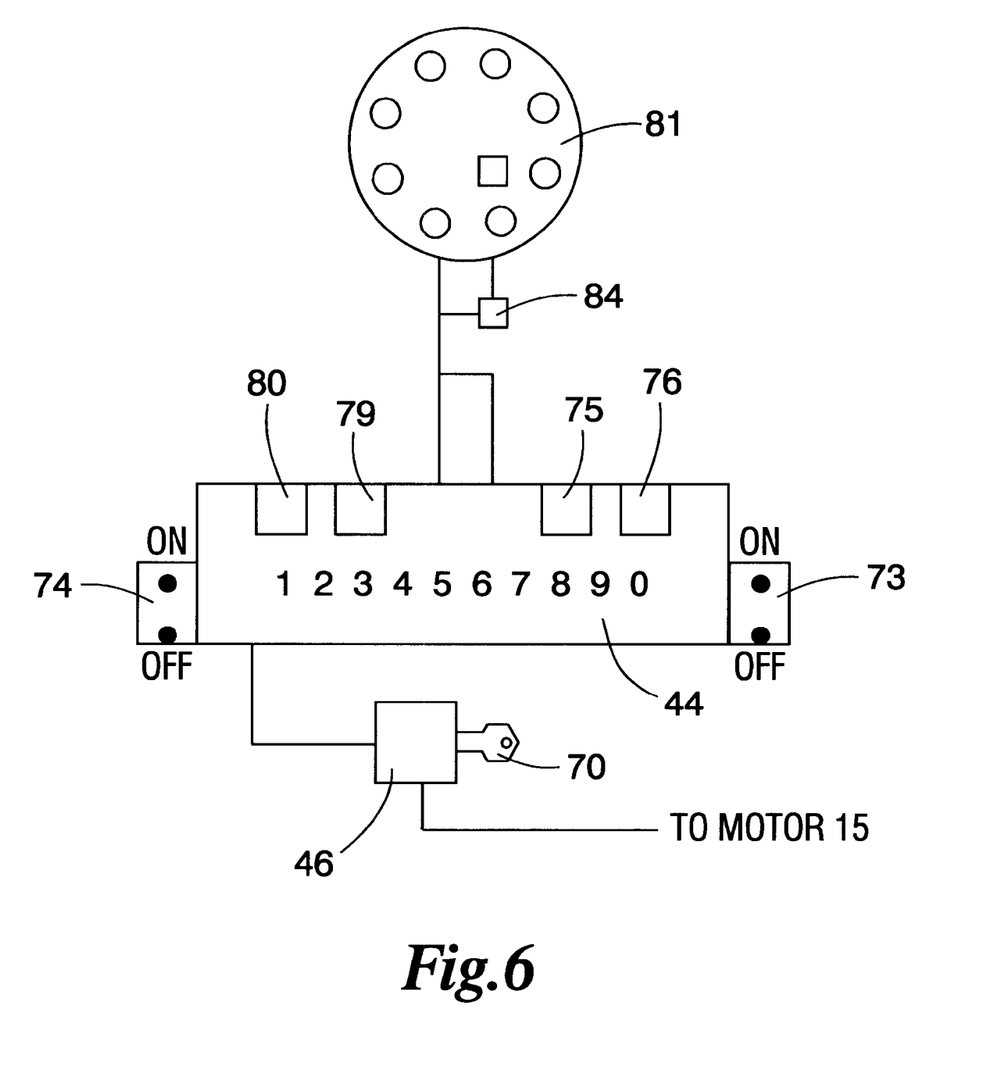
FIG. 6 is a schematic view of the code box and its connection to the distributor by infrared signal.

Referring to FIGS. 6 and 8, to start engine 15 a selected code is set in code box 44. Ignition switch 46 and timer switch 57 are turned on. After engine 15 is started electromagnet 59 holds lock block 66 out of engagement with steering column 13 whether engine 15 continues running or not, until timer switch 57 is turned off. Ignition switch 46 will connect power from battery 54 to starter 56 and engine 15 will then start. When engine 15 starts, the oil pressure rises in engine oil line 65 to engine oil space 64 and holds magnetic piston 62, piston rod 63 and lock block 66 out of engagement with liner 69 and the vehicle can be driven.

Figure 2:
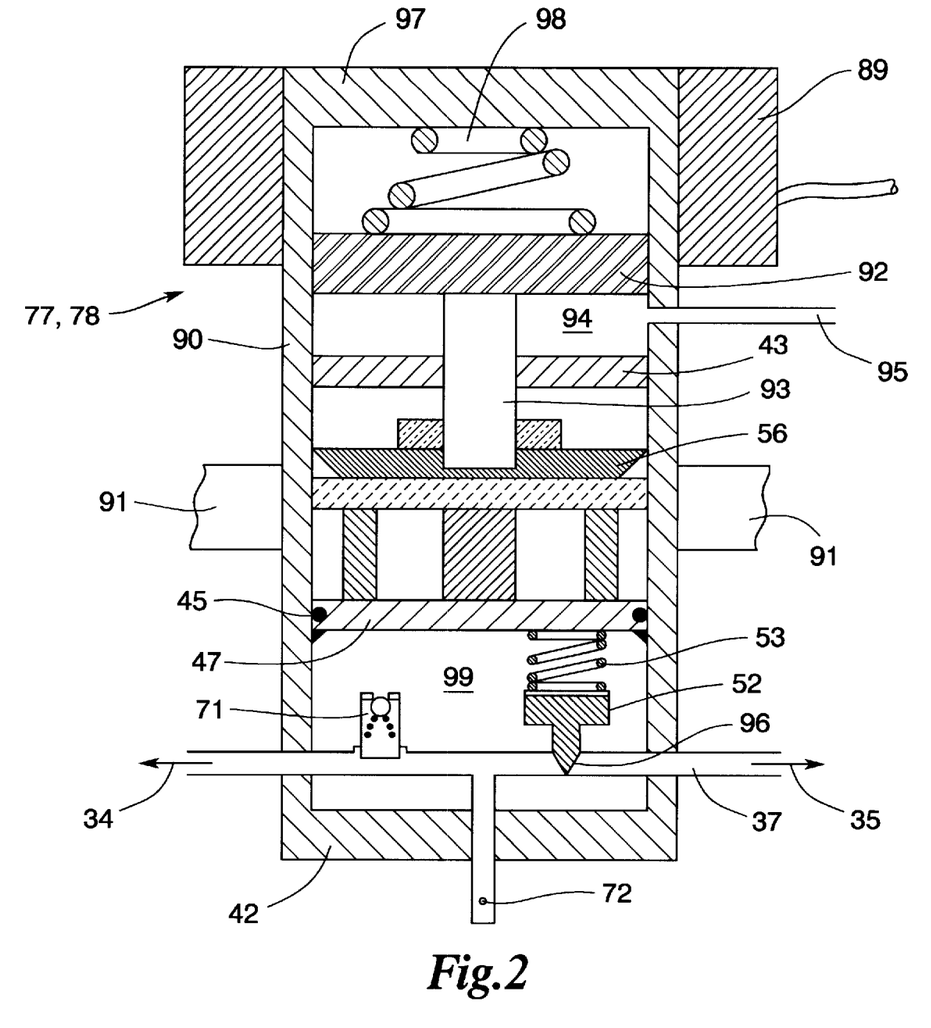
FIG. 2 is a cross sectional view of a brake lock according to the invention.
Figure 2A:
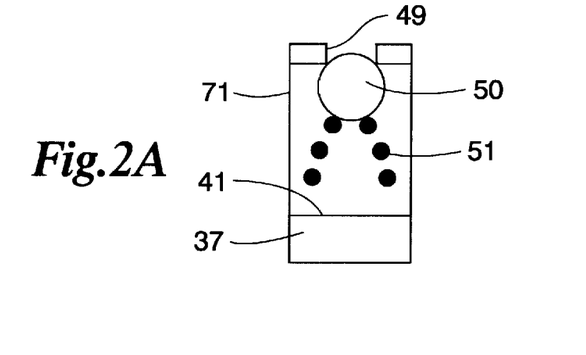
FIG. 2A is cross sectional view of a back pressure valve for use with the brake lock shown in FIG. 2.
Figure 3:
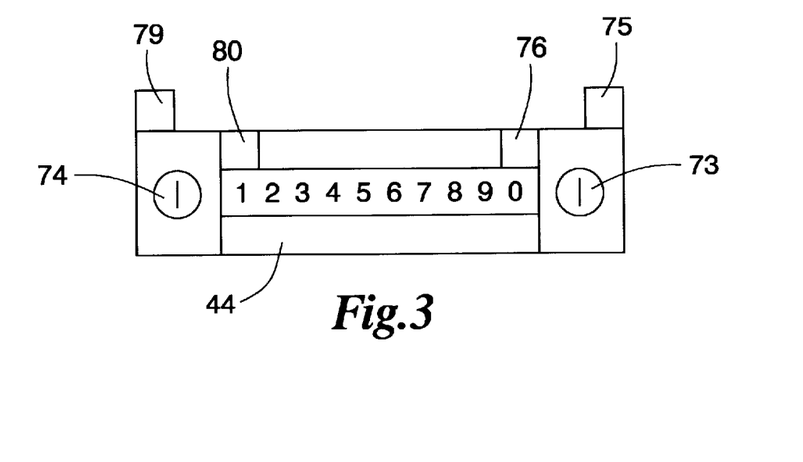
FIG. 3 is a diagram of a code box to limit access to the vehicle to operators that have the required code.
Figure 4:
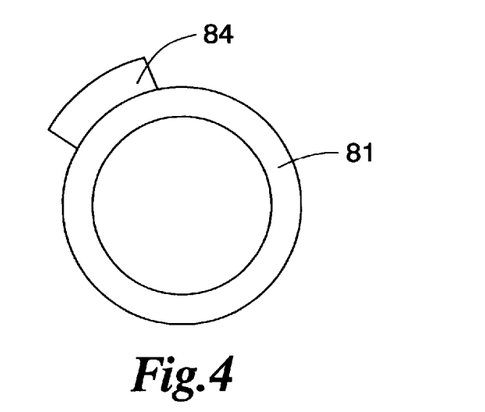
FIG. 4 is a schematic view of an anti-theft device for disabling a gas engine.
Figure 4A:
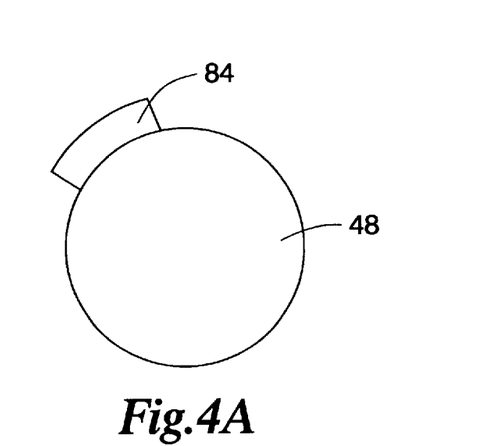
FIG. 4A is a schematic view of an anti-theft device for disabling a diesel engine.

Front brake locks 77, 78 are shown in FIGS. 2 and 2A. Front brake lock 77 will lock both front brakes when vehicle 10 is parked. Rear brake lock 78 will lock both rear brakes when vehicle 10 is parked. Front and rear brake locks 77, 78 are made up of hollow cylinder 90, which are supported on vehicle structure 91. Hollow cylinder 90 has magnetic piston 92. Piston rod 93 is fixed to magnetic piston 92. Piston rod 93 has lock block 96 supported on lock block support 52.

Hollow cylinder 90 has cylinder head 97 at its upper end and cylinder bottom 42 at its lower end. Hollow cylinder 90 also has engine oil space 94, which is pressurized through engine oil line 95 when the motor is started and the oil pressure increases. Engine oil space 94 is bounded at its upper end at magnetic piston 92 and at its lower end by engine oil space bottom 43. Engine oil space 94 has at its upper end magnetic piston 92, which can be moved upwardly or downwardly by means of electromagnet 89 and helical spring 98, depending on the pressurization into engine oil space 94 from engine oil line 95. Engine oil space bottom 43 is fixed in position in hollow cylinder 90. Piston rod 93 is rigidly attached to magnetic piston 92 at its upper end and extends through engine oil space 94 and through engine oil bottom 43 and is fixed to hydraulic compression head 56. Brake fluid chamber 99 is bounded at its lower end by cylinder bottom 42 and at its upper end by movable brake fluid chamber head 47. Brake fluid chamber head 47 has seal 45 running around its outer periphery and engaging the inner surface of hollow cylinder 90. The brake fluid chamber head 47 and hydraulic compression head 56 are rigidly attached to each other. Engine oil line 95 is connected to the engine oil system so that engine oil under pressure will enter engine oil space 94 under magnetic piston 92 when engine 15 starts.

When engine 15 is not running, helical compression spring 98 holds lock block 96 in contact with brake line 37, which stops the flow of brake fluid. Brake petal 11 should be pushed to build up brake fluid pressure in brake fluid chamber 99 prior to turning off engine 15.

Magnetic piston 92 can only be operated by means of code box 44 and timer switch 57, or by oil pressure from engine oil line 95. When ignition switch 46 is turned off, engine 15 will stop and the engine oil pressure will decrease in engine oil space 94. The oil pressure reduction allows lock block 96 to move into engagement with and obstruct brake fluid line 37.

To start engine 15 a selected code is set in code box 44. Ignition switch 46 is turned on with key 70. After engine 15 is started electromagnet 89 moves lock block 96 out of engagement with brake fluid line 27 whether engine 15 continues running or not, until timer switch 57 is turned off. Ignition switch 46 will connect power from battery 54 to distributor 81 and engine 15 will then start. When engine 15 starts the oil pressure rises in engine oil line 95 to engine oil space 94 and hold magnetic piston 92, piston rod 93 and lock block 96 out of engagement with brake line 37 and vehicle 10 can be driven.

Brake locks 77 and 78 have brake fluid line 37 extending therethrough with front wheel brake cylinders 30 and rear wheel brake cylinders 31 in a direction 34 and master brake cylinder 17 in a direction 35.

Lock block 96 is supported by lock block support 52. Lock block support 52 is supported by compression spring 53, which is fixed to brake fluid chamber head 47. Brake fluid chamber head 47 is moved up and down by magnetic piston, compression spring 53 allows for some flexibility in the system as lock block 96 is moved across and completely obstructs brake fluid line 37. Brake fluid line 37 is provided with a bleeder valve at 72 and back pressure valve 71, which has upper opening 49, ball 50 obstructing upper opening 49, spring 51 holding ball 50 closed against upper opening 49, outlet 41 that allows brake fluid to exit brake fluid chamber 99 into brake fluid line 37 when excess pressure is experienced in brake fluid chamber 99.

Figure 5:
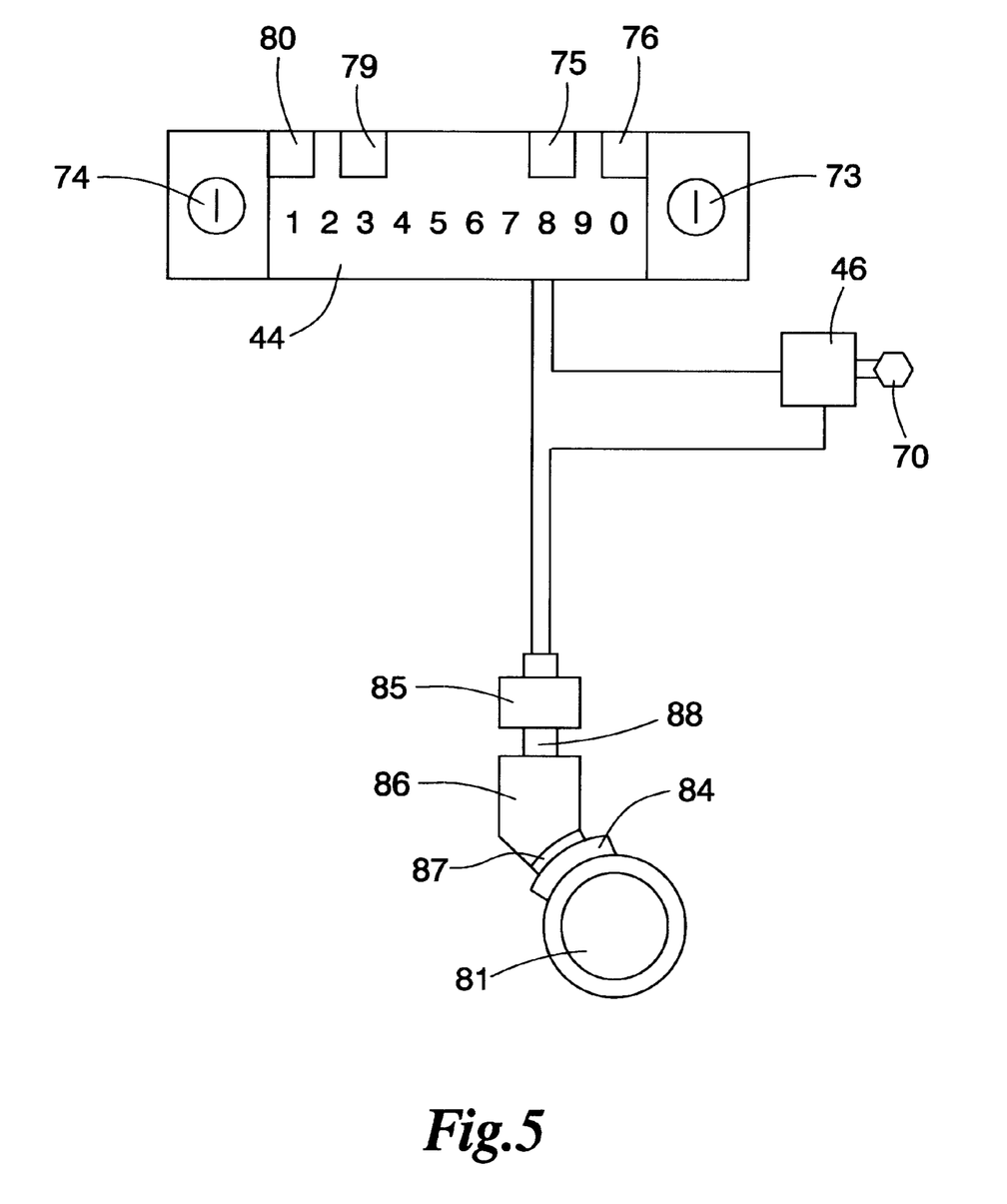
FIG. 5 is a schematic view showing a distributor having a kill switch operated by an infrared signal projected through a tube shaped shield.

FIG. 5 illustrates an infrared actuating system in which infrared projector 85 is actuated by a signal received from code box 44. Infrared projector 85 projects a signal over infrared path 88, and through infrared beam shield 86 to infrared pickup 87, which will activate infrared switch 84, which will turn distributor 81 on or off.

The embodiments of the invention in which an exclusive property or privilege is claimed are defined as follows:

1. A theft prevention device for a vehicle having a pressurized oil supply comprising:

connecting means connected to said oil supply to a part of said vehicle whereby a functional part is disabled when an engine of said vehicle is stored wherein said functional part is an operative shaft;

a hollow cylinder having a first closed end and a second closed end;

a piston slidably supported in said hollow cylinder;

said piston having a piston rod extending through said second closed end of said hollow cylinder;

a first engaging member on said piston rod;

a second engaging member on said operative shaft;

a helical compression spring in said hollow cylinder adjacent said first closed end of said end for urging said piston toward said second closed end and urging said first engaging member into engagement with said second engaging member;

an oil line from said system is connected to said hollow cylinder adjacent said first end thereof whereby oil from said vehicle engine when running exerts pressure on said piston holding said first engaging member out of engagement with said second engaging member thereby allowing said vehicle to be operative.

2. The theft prevention device recited in claim 1 wherein said piston is magnetic and magnetic means is provided on said hollow cylinder to move said magnetic piston toward said first end of said hollow cylinder whereby said first engaging member is moved out of engagement with said second engaging member.

3. The theft prevention device recited in claim 1 wherein said second engaging member comprises a circular disk having a central opening and said second engaging member being on the outer periphery of said circular disk receiving said first engaging member on said piston rod.

4. The theft prevention device recited in claim 1 wherein said magnetic means comprises an electromagnet on said hollow cylinder and a coded switch for connecting said electromagnet to a source of electricity to hold said piston rod away from said gear rim whereby said first engaging member on said piston rod is disengaged from said second engaging member on said operative shaft.

5. The theft prevention device recited in claim 1 wherein said engine has an electrical starter and first switch means connects said starter to a source of electricity and to said electromagnet.

6. The theft prevention device recited in claim 1 wherein a steering wheel lock switch is connected to said electromagnet by said steering wheel lock switch which connects said electrical power from said electromagnet when said engine is started.

7. The theft prevention device recited in claim 1 comprising a code box having a right side switch, a second side switch, a key activated switch, an infrared kill switch to disable an engine distributor, a transmission lock, a steering column lock, a front brake lock and a rear hydraulic brake lock.

8. The theft prevention device recited in claim 1 having an electrical system;

an electrical conduit in said electrical system to connect and disconnect said electrical system to a necessary part of said vehicle;

said electrical system including an infrared kill switch;

an actuating means for actuating said infrared kill switch to disable said electrical system and to enable said electrical system.

9. The theft prevention device recited in claim 1 having an electrical system and further comprising a hollow shield disposed around an infrared signal path for an infrared kill switch whereby said signal path is maintained clear for signaling.

10. A theft prevention device for a vehicle having a pressurized oil supply comprising:

connecting means connected to said oil supply to a part of said vehicle whereby a functional part is disabled when an engine of said vehicle is stored;

an operative shaft and a hydraulic cylinder supported on said vehicle adjacent said operative shaft;

said hydraulic cylinder having a piston with a piston rod attached thereto;

a helical compression spring in said hydraulic cylinder urging said piston to move said piston rod into engagement with said operative shaft for holding said operative shaft in position;

said pressurized oil supply connected to said hydraulic cylinder for urging said piston to move said piston rod out of engagement with said operative shaft when said engine is running and an electromagnet is supported on said hydraulic cylinder.

11. The security system for a vehicle having an electrical system recited in claim 10, further comprising a hollow shield disposed around an infrared signal path for an infrared kill switch whereby said signal path is maintained clear for signaling.

12. The theft prevention device recited in claim 11 wherein brakes of said vehicle are applied to prevent theft of said vehicle.

13. The theft prevention device recited in claim 11 incorporates an infrared device.

14. The theft prevention device recited in claim 10 wherein said code box is connected to said electromagnet whereby said electromagnet is disabled from moving said piston rod away from said operative shaft when the code box is turned off.

15. The theft prevention device recited in claim 14 wherein said operative shaft is a drive shaft.

16. The theft prevention device recited in claim 14 wherein said operative shaft is a shifter lever.

17. The theft prevention device recited in claim 10 wherein said operative shaft is a shifter lever.

18. The theft prevention device recited in claim 10 comprising a code box having a right side switch, a second side switch, a key activated switch, an infrared kill switch to disable an engine distributor, a transmission lock, a steering column lock, a front brake lock and a rear hydraulic brake lock.

19. The theft prevention device recited in claim 10 having an electrical system;

an electrical conduit in said electrical system to connect and disconnect said electrical system to a necessary part of said vehicle;

said electrical system including an infrared kill switch;

an actuating means for actuating said infrared kill switch to disable said electrical system and to enable said electrical system.

* * * * *